March 8, 1949.　　　L. J. PITTLICK　　2,464,098
MATERIAL LOADING AND UNLOADING APPARATUS
Filed July 4, 1945　　　　　　2 Sheets-Sheet 1
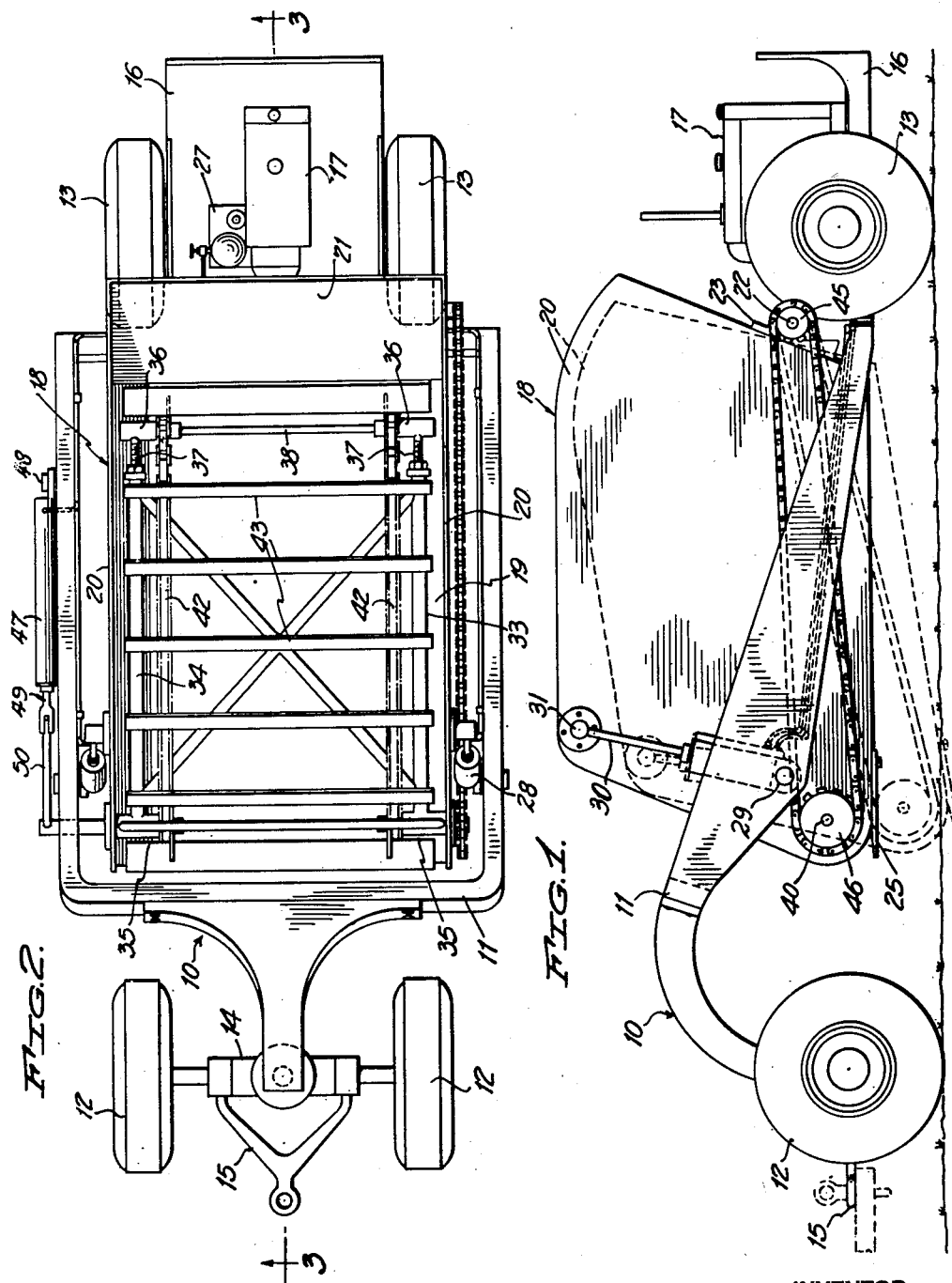
INVENTOR
LOUIS J. PITTLICK
BY
ATTORNEYS March 8, 1949.                L. J. PITTLICK                2,464,098
                  MATERIAL LOADING AND UNLOADING APPARATUS
Filed July 4, 1945                                    2 Sheets-Sheet 2
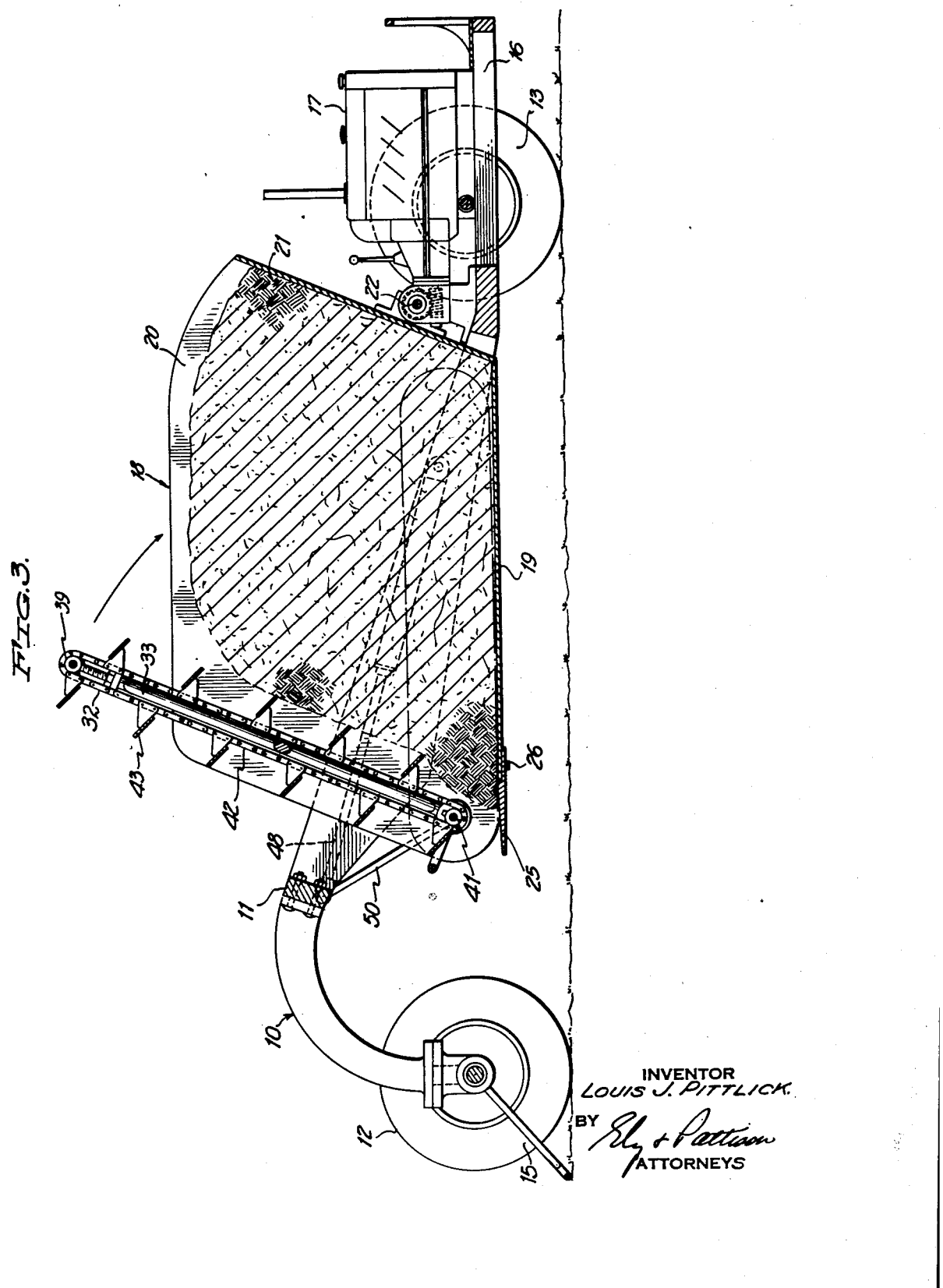
INVENTOR
LOUIS J. PITTLICK.
BY
ATTORNEYS Patented Mar. 8, 1949

2,464,098

UNITED STATES PATENT OFFICE 2,464,098

MATERIAL LOADING AND UNLOADING APPARATUS

Louis J. Pittlick, Fords, N. J.

Application July 4, 1945, Serial No. 603,167

4 Claims. (Cl. 37—8)

1

This invention relates to a mobile apparatus or vehicular trailer for handling materials such as dirt, sand, gravel, cinders and the like.

An object of the invention is the provision of an apparatus or trailer of the indicated character which may be used for loading, transporting, unloading and spreading the above-mentioned kinds of materials for various purposes such as surfacing fields for aircraft, and other rough tracts, plots and roadways.

A further object of the invention is the provision of a vehicular apparatus embodying improvements whereby such apparatus may be loaded to capacity with materials such as dirt, sand, etc., and later be unloaded or spread as the apparatus is in translatory movement.

A further object of the invention is the provision of a mobile apparatus or trailer having a body adapted to receive and discharge material of the character mentioned, said body being tiltable up and down, and a conveyor positioned to assist in the loading and unloading of the materials, as the apparatus or trailer travels from one point to another.

With the foregoing and other objects in view the invention resides in the combination, arrangement and operation of the elements hereinafter described and illustrated in the accompanying drawings, in which, Figure 1 is a side elevational view of a vehicular trailer embodying the features of the present invention.

Figure 2 is a top plan view.

Figure 3 is a longitudinal sectional view taken on the line 3—3 of Figure 2.

Referring now more particularly to the several views of the drawings, it will be apparent, the features of the invention are embodied in a vehicular trailer adapted to be towed or hauled by a tractor or the like. The trailer includes a running gear 10 comprising a frame or chassis 11 and front and rear traction wheels 12 and 13 respectively. The wheels 12 are on a pivoted bolster 14 connected with the frame 11. A hitch 15 on the bolster 14 may be engaged with suitable means on a tractor for coupling the trailer thereto. The frame 11 supports a rear platform 16 on which is mounted a power unit designated in general by the numeral 17.

There is provided a body 18 having a bottom 19, side walls 20 and a back wall 21, and said body is open at the front from the bottom all the way to the top as shown. A shaft 22 is journalled on the frame 11 in advance of the platform 16 and at the rear of said frame. The shaft 22 is

2 disposed transversely at a right angle with respect to the longitudinal axis of the frame. The shaft 22 extends through bearings 23 on the back wall 21 so that the body 18 is tiltably mounted for up and down movement within and with respect to the frame 11. The body 18 thus constructed, mounted and arranged, may function as a large scoop when tilted forwardly and downwardly as indicated in dotted lines in Figure 1. The bottom 19 has a scooping blade 25 secured thereto along its front end, as at 26. The blade 25 serves to scoop material such as dirt, sand, gravel, when the body 18 is properly tilted and the trailer is travelling forwardly.

In order to tilt the body 18 for the purposes stated there is provided suitable means such as a hydraulic system conventionally shown and not specifically claimed herein. The system includes a pump 27 on the platform 16. Piston cylinders 28 are connected in the system with the pump. The cylinders 28 are on opposite sides of the frame 11 respectively and each cylinder 28 has its lower end pivotally connected with the frame, as at 29. The upper end of the piston rod 30 associated with each cylinder 28 has its upper end pivotally connected, as at 31, with the adjacent side wall 20 of the body 18. When the piston rods 30 move upwardly, the front end of the body 18 moves upwardly causing the body 18 to be raised from a previous position to another position with its bottom 19 disposed at the desired inclination, or disposed approximately horizontal, as shown in Figure 3. Conversely, when the rods 30 move downwardly, the body 18 is lowered at the front end with the bottom 19 tilted downwardly and forwardly at the desired scooping angle, or so as to discharge material from the body 18 spread over the area to be surfaced with the material.

In order to assist in loading the material into the body, and to assist in unloading the material from the body, and to spread the material as it is being unloaded, there is provided a conveyor 32. The conveyor includes a suitable rigid frame 33, which is substantially rectangular and has inner bracing. The side members 34 of the frame have sleeves 35 on their lower ends respectively. The upper ends of the members 34 are connected with bearings 36 by adjustable connections 37 respectively. A shaft 38 is supported by the bearing 36. Sprockets 39 are fast on the shaft 38 near its ends. A shaft 40 is supported by bearings on the side walls 20 of the body 18. The shaft 40 extends through the sleeves 35 on the conveyor frame 33. The shaft 40 is located at the front of the body 18, and above but near the bottom 19. The shaft 40 has a sprocket 41 fast thereon near the opposite ends. Thus there is one sprocket 39 and one sprocket 41 at each side of the frame 33. A chain 42 encircles the sprockets at each side. Secured to the chains 42 and extending transversely with respect to the longitudinal axis of the frame 33 is a series of flights or slats 43. These flights or slats are spaced with respect to each other and are pitched outwardly with respect to the chains 42.

In order to transmit motion to the chains 42, there is provided a chain 44 which encircles sprockets 45 and 46 fast on the shafts 22 and 40 respectively. The shaft 22 is geared to and driven by the engine of the power unit 17. It will therefore be understood the conveyor 32 is operated through the intervention of the shaft 22, sprocket 45, chain 44, sprocket 46, shaft 40, sprockets 41 and 39, and chains 42. By reversing the engine of the power unit 17, the aforesaid driven parts will also operate reversely, and as a consequence the operating elements 43 will travel reversely, or in a clockwise direction as seen in Figure 3. The reverse operation of the conveyor 32 is for assisting in unloading the material from the body 18. The direct operation of the conveyor 32 is for assisting in loading the body 18 to capacity.

In order to swing the conveyor, or to adjust it progressively to various angularities in either direction with respect to the body 18 there is provided means included in the hydraulic system aforesaid. Said means consists of a cylinder 47 on one side of the frame 11. One end of the cylinder 47 is pivotally connected, as at 48, with the frame 11. The piston rod associated with the cylinder 47 is pivotally connected, as at 49, with one end of an arm 50 whose other end is rigidly connected with an extension on one of the sleeves 35, as shown in Figure 2.

Having thus described my invention, what I claim as new and desire to secure by Letters Patent, is:

1. A mobile apparatus including the combination of a frame having traction wheels, a body having a bottom, sides and a back, and open at the front, said body being tiltable up and down on an axis extending transversely to the longitudinal axis of the frame, and an endless conveyor tiltably mounted at the open end of said body for movement between a position approximately parallel to said bottom and a position approximately perpendicular to said bottom, said conveyor being reversely operable for aiding in loading material into said body or unloading material therefrom during translatory movement of the apparatus.

2. A mobile apparatus as set forth in claim 1, wherein the conveyor is mounted on and movable with said body.

3. A mobile apparatus as set forth in claim 1, wherein a shaft is supported on said body near the bottom and extending transversely thereof, and said conveyor is tiltably mounted on said shaft, said shaft constituting a part of the means for driving the conveyor.

4. A mobile apparatus as set forth in claim 1, wherein a shaft is supported on the rear of said frame and extending transversely thereof, said body being tiltably mounted on said shaft, a second shaft is supported on said body near the bottom and extending transversely thereof, and said conveyor is tiltably mounted on said second shaft, said shafts constituting parts of the means for driving the conveyor.

LOUIS J. PITTLICK.

REFERENCES CITED

The following references are of record in the file of this patent:

UNITED STATES PATENTS

| Number | Name | Date |
|---|---|---|
| Re. 21,170 | Paulsen | Aug. 1, 1939 |
| 1,409,916 | Barkmann et al. | Mar. 21, 1922 |
| 1,515,329 | Barkmann et al | Nov. 11, 1924 |
| 1,537,558 | Schultz | May 12, 1925 |
| 1,949,861 | Call | Mar. 6, 1934 |